United States Patent
Schneider et al.

(10) Patent No.: US 12,402,990 B2
(45) Date of Patent: Sep. 2, 2025

(54) METHOD OF MACHINING A DENTAL RESTORATION WITH REDUCED CONTOUR FALSIFICATION

(71) Applicant: DENTSPLY SIRONA Inc., York, PA (US)

(72) Inventors: Hans-Christian Schneider, Einhausen (DE); Franz Basler, Laudenbach (DE); Daniel Weiss, Heddesheim (DE)

(73) Assignee: Dentsply Sirona Inc., York, PA (US)

( * ) Notice: Subject to any disclaimer, the term of this patent is extended or adjusted under 35 U.S.C. 154(b) by 609 days.

(21) Appl. No.: 17/641,128

(22) PCT Filed: Sep. 21, 2020

(86) PCT No.: PCT/EP2020/076235
§ 371 (c)(1),
(2) Date: Mar. 8, 2022

(87) PCT Pub. No.: WO2021/058417
PCT Pub. Date: Apr. 1, 2021

(65) Prior Publication Data
US 2022/0331074 A1 Oct. 20, 2022

(30) Foreign Application Priority Data
Sep. 24, 2019 (EP) .................................. 19199323

(51) Int. Cl.
*A61C 13/00* (2006.01)
*G05B 19/404* (2006.01)
*B23Q 15/00* (2006.01)

(52) U.S. Cl.
CPC .......... *A61C 13/0004* (2013.01); *A61C 13/00* (2013.01); *A61C 13/0006* (2013.01);
(Continued)

(58) Field of Classification Search
USPC ........................................................ 700/159
See application file for complete search history.

(56) References Cited

U.S. PATENT DOCUMENTS 5,251,405 A * 10/1993 Clauss .................... B24B 19/08
451/25
2002/0102916 A1 8/2002 Rothenberger
(Continued)

FOREIGN PATENT DOCUMENTS

CA 3152967 A1 4/2021
CN 114401818 A 4/2022
(Continued)

OTHER PUBLICATIONS

International Search Report; PCT/EP2020/076235; Oct. 9, 2020 (completed); Oct. 21, 2020 (mailed).
(Continued)

*Primary Examiner* — Emilio J Saavedra
(74) *Attorney, Agent, or Firm* — SCHWEGMAN LUNDBERG & WOESSNER, P.A.

(57) ABSTRACT

A method of machining at least one dental restoration (1) from a workpiece (2) using one or more dental took (3), including a step of defining, a target contour (4) of the dental restoration (1); also including a step of predicting the deflection of the dental tool (3) during pre-machining through a model based on one or more machining parameters; a step of determining based on the prediction step one or more primary locations (5) at which the target contour (4) would have been damaged during pre-machining; a step of modifying the target contour (4) or the corresponding machining path by adding an oversize of material (6) substantially only at the primary locations (5) for preventing damage; and a step of pre-machining the workpiece (2)
(Continued)

based on the modified target contour (17) or the corresponding modified machining path.

11 Claims, 5 Drawing Sheets

(52) U.S. Cl.
CPC ........ *A61C 13/0022* (2013.01); *G05B 19/404* (2013.01); *B23Q 15/00* (2013.01); *G05B 2219/45167* (2013.01)

(56) References Cited

U.S. PATENT DOCUMENTS

| | | | |
|---|---|---|---|
| 2012/0324731 A1* | 12/2012 | Gagnon | B23K 26/0846 29/896.1 |
| 2013/0024021 A1* | 1/2013 | Atabey | G05B 19/404 700/176 |
| 2015/0230896 A1 | 8/2015 | Korten | |
| 2017/0065380 A1* | 3/2017 | Leeson | G05B 19/4099 |
| 2019/0232377 A1* | 8/2019 | Ostling | B23Q 17/2233 |
| 2021/0205058 A1* | 7/2021 | Huber | A61C 13/0006 |

FOREIGN PATENT DOCUMENTS

| | | | |
|---|---|---|---|
| CN | 114401818 | | 3/2025 |
| EP | 3797735 A1 | | 3/2021 |
| EP | 3797735 B1 | | 10/2022 |
| JP | 2013059841 A | | 4/2013 |
| JP | 2015168057 A | | 9/2015 |
| JP | 2022549482 A | | 11/2022 |
| KR | 20180060521 A | * | 6/2018 |
| KR | 20220066087 A | | 5/2022 |
| WO | 2007110655 A2 | | 10/2007 |
| WO | WO-2021058417 A1 | | 4/2021 |

OTHER PUBLICATIONS

International Preliminary Report on Patentability; PCT/EP2020/076235; Oct. 9, 2020 (completed); Oct. 21, 2020 (mailed).

Written Opinion of the International Searching Authority; PCT/EP2020/076235; Oct. 9, 2020 (completed); Oct. 21, 2020 (mailed).

Rao et al.; "Tool Deflection Compensation in Peripheral Milling of Curved Geometries"; International Journal of Machine Tools and Manufacture, Elsevier, Amsterdam, NL; vol. 46, No. 15; Dec. 1, 2006; pp. 2036-2043.

Ma Wenkui et al.; "Tool Deflection Error Compensation in Five-axis ball-end Milling of Sculptured Surface"; The international Journal of Advanced Manufacturing Technology, Springer, London; vol. 84, No. 5; Sep. 16, 2015; pp. 1421-1430.

Chinese Office Action dated Mar. 25, 2024.

Japanese Office Action dated Jun. 4, 2024.

"European Application Serial No. 19199323.7, Extended European Search Report mailed Mar. 31, 2020", 7 pgs.

"European Application Serial No. 19199323.7, Response filed Sep. 30, 2021 to Extended European Search Report mailed Mar. 31, 2020", 21 pgs.

"European Application Serial No. 20771896.6, Noting of loss of rights pursuant to Rule 112(1) EPC mailed May 18, 2022", 2 pgs.

"Japanese Application Serial No. 2022-518996, Decision of Refusal mailed Nov. 5, 2024", w/ English Translation, 4 pgs.

"Japanese Application Serial No. 2022-518996, Notification of Reasons for Refusal mailed Jun. 4, 2024", w/ English Translation, 6 pgs.

"Japanese Application Serial No. 2022-518996, Response filed Aug. 9, 2024 to Notification of Reasons for Refusal mailed Jun. 4, 2024", w/ English Clams, 10 pgs.

"Japanese Application Serial No. 2022-518996, Response filed Mar. 4, 2025 to Decision of Refusal mailed Nov. 5, 2024", w current English claims, 10 pgs.

\* cited by examiner

METHOD OF MACHINING A DENTAL RESTORATION WITH REDUCED CONTOUR FALSIFICATION

CROSS-REFERENCE TO RELATED APPLICATIONS

This is a National Phase application of International Application No. PCT/EP2020/076235, filed Sep. 21, 2020, which claims the benefit of and priority to European Application Ser. No. 19199323.7, filed on Sep. 24, 2019, which are herein incorporated by reference for all purposes.

TECHNICAL FIELD OF THE INVENTION

The present invention relates to a method of machining a dental restoration from a workpiece using one or more dental tools. The present invention also relates to a dental machining system for machining a dental restoration from at least one workpiece.

BACKGROUND OF THE INVENTION

When machining workpieces with rotationally symmetric tools such as milling cutters, grinders, the tool is bent or deflected due to the machining forces acting. Reference is made to WO2007/110655A2 which discloses a method of machining a blank. The tool deflection in the radial direction is qualitatively similar with the deflection of a one-sided clamped bending beam with longitudinally variable diameter. The tool deflection causes a contour falsification at every working point during the machining. The extent of contour falsification essentially depends on the amount of overlap between the tool and the workpiece, and the infeed. The infeed is typically 50 μm for fast grinding and 25 μm for fine grinding. The maximum local contour falsification with fast grinding at full overlap is typically around 300 μm. The part of the contour falsification independent of the overlap causes a contour displacement and the part that depends on the overlap causes a contour distortion. Despite the considerable displacement of 300 μm, usable dental restorations can be machined in a single step machining. However, in the case of dental restorations such as inlays and partial crowns produced with strongly fluctuating tool/workpiece overlap during the machining, the quality of the dental restoration decreases and receives for instance an uneven support, missing edge closure, edge breakouts and the like. In general, a contour falsification is either accepted or compensated through a two-step machining. In the two-step machining, the entire restoration is first overlaid with a global oversize and pre-machined i.e., through fast grinding or roughing, to remove the substantial part of the excess material and thereby to reduce the tool load for one or more orders of magnitude for the second step, namely the post-machining i.e., fine grinding or finishing. However, the two-step processing leads to a significant increase in the processing time.

SUMMARY

An objective of the present invention is to overcome the problems of the prior art in as much as possible and to provide a method of machining a dental restoration from a workpiece by using one or more dental tools in which the geometric distortion of the dental restoration can be avoided or reduced as much as possible and the processing time can be comparatively shortened.

This objective is achieved through the computer-implemented method as defined in claim 1, and the dental machining system as defined in claim 7. The other claims relate to further developments.

The present invention provides a method of machining at least one dental restoration from a workpiece by using one or more dental tools. The method comprises: a step of defining a target contour of the dental restoration; a step of predicting the deflection of the dental tool during pre-machining through a model based on one or more machining parameters; a step of determining based on the prediction step one or more primary locations at which the target contour would have been damaged during pre-machining; a step of modifying the target contour or the corresponding machining path by adding an oversize of material only at the primary locations for preventing damage; and a step of pre-machining the workpiece based on the modified target contour or the corresponding modified machining path.

A major advantageous effect of the present invention is that the problem of contour falsification caused by the tool deflection can be overcome or reduced as much as possible by using the model that predicts the tool deflection and, thereby, the resulting contour distortion and contour displacement. Unlike the above-mentioned prior art, in the pre-machining step of the present method an oversize of material is generated substantially only at the target contour where the local tool deflection would have damaged the final contour. Thereby, the dental restoration quality can be increased, and the processing time can be reduced. Thereby, also the manufacturing costs can be saved. Other major advantageous effects of the present invention are that the accuracy of the fit can be increased, any detail on the dental restoration can be selectively increased by using a thinner tool, the holding pin of the dental restoration can be thinned out, and the preparation line can be finished with higher accuracy.

According to the present invention, the method may be optionally provided with two-step machining having the above described pre-machining step and an additional post-machining step. Therefore, in an embodiment of the present invention, the method optionally comprises a step of determining based on the prediction step one or more secondary locations at which an excess of material will be left after the pre-machining step; and a step of post-machining the workpiece substantially only at the secondary locations for removal of the excess of material. Unlike the above-mentioned prior art, in the post-machining step of the present method substantially only the secondary locations are machined. Thereby, the dental restoration can be finished with a higher accuracy and the processing time can be comparatively reduced. Thereby, the manufacturing costs can be further saved.

In an alternative embodiment, the step of determining one or more secondary locations at which an excess of material will be left after the pre-machining step is based on a sensor feedback during the pre-machining step. The force between the tool and the workpiece may be directly measured through a sensor to establish the sensor feedback. The sensor may be arranged in the retainer of the workpiece. Alternatively, the current supply of the tool motor may be monitored to establish the sensor feedback.

According to the present invention, the post-machining step may be optionally based on clinical relevance. Therefore, in an embodiment, the method further comprises a step of dispensing with the post-machining of the workpiece at one or more of the secondary locations for removal of the excess of material if at these secondary locations the post-machining is clinically less relevant or irrelevant. For instance, the front side and rear side of the dental restorations may be considered clinically less relevant than the left side and right sides of the dental restoration which must generally precisely fit to the neighboring teeth with a good accuracy. A misfit could complicate the insertion of the dental restoration in place or cause an accumulation of food rests and the like. The computer implemented method may comprise a neural network that recognizes per artificial intelligence the locations of the dental restoration that are clinically less relevant or irrelevant.

According to the present invention, the values of infeed for the two-step machining can be flexibly set in accordance with the processing time and the desired accuracy. In an embodiment, the infeed for the pre-machining step is set larger than the infeed for the post-machining step. Since the risk of damaging the dental restoration is prevented or reduced as much as possible due to model based damage prediction, the infeed in the pre-machining step can be comparatively increased. Thereby, the processing time can be safely further reduced. Thanks to the expedited pre-machining with the comparatively high infeed, in the post-machining the infeed can be comparatively decreased. Thereby the quality of the dental restoration can be further improved without prolonging the overall machining time.

According to the present invention, different dental tools can be used in the pre-machining step and the post-machining step. Therefore, in an embodiment, in the pre-machining step a dental tool for roughing is used. And in the post-machining step a dental tool for finishing is used. Thereby, the quality of the dental restoration can be improved with comparatively low processing time.

According to the present invention, the machining parameters of the model include the length of the overlap between the dental tool and the workpiece, and the machining force between the dental tool and the workpiece. The amount of deflection depends on both machining parameters. The values of the machining parameters can be obtained from the machining path reconstructed from the target geometry in order to predict the tool deflection throughout the machining. Instead of the machining force, the current supply to the tool motors may also be used as a machining parameter in the model. The model is prepared in advance of the entire pre- and post-machining steps. The model may be provided in form of a look up table or a 3D characteristic map.

The present invention also provides a dental machining system. The dental machining system has a dental tool machine which includes one or more carriages for driving one or more dental tools for machining a dental restoration from at least one workpiece. The dental machining system has a control means for individually controlling the carriages. The control means controls the carriages in accordance with the method of the present invention. The dental machining system may also have a CAD/CAM module for performing at least some of the steps other than the pre- and post-machining steps. The CAD/CAM module preferably includes a computer station or a micro-processing unit that is provided separately from the dental tool machine. The communication therebetween may be performed via a network or the like. The CAD/CAM module may be also provided as part of the dental tool machine. The present invention also provides a computer-program for implementing the method. The computer-program has computer-readable codes for causing a computerized dental machining system to carry out the steps of the method. The computer-program is stored in computer-readable storage medium. The storage medium may be portable or integrated. The storage medium may be located external or internal to the dental machining system. The storage medium may be reachable through a network or the like.

BRIEF DESCRIPTION OF THE DRAWINGS

In the subsequent description, further aspects and advantageous effects of the present invention will be described in more detail by using exemplary embodiments and by reference to the drawings, wherein FIG. 1—is a schematic partial perspective view of a dental machining system according to an embodiment of the present invention.

DETAILED DESCRIPTION OF THE INVENTION

Figure 2:
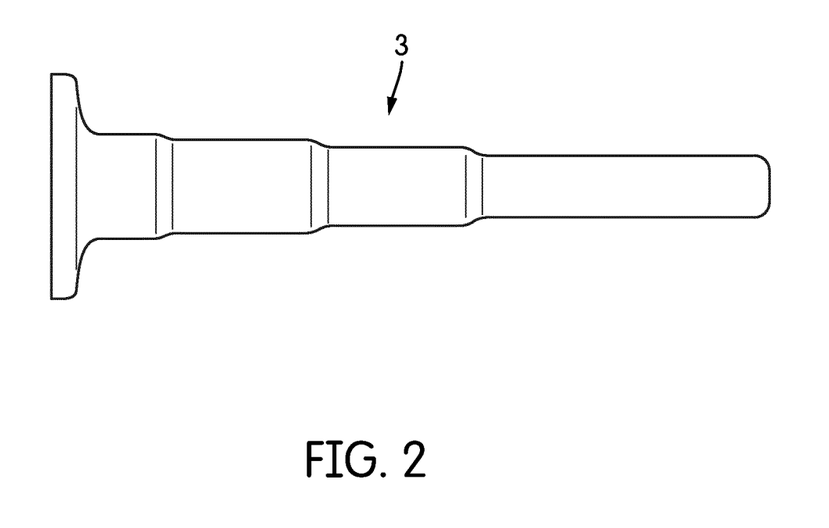
FIG. 2—is a schematic enlarged partial side view of a dental tool according to an embodiment of the present invitation, used in the dental machining system of FIG. 1.
Figure 3:
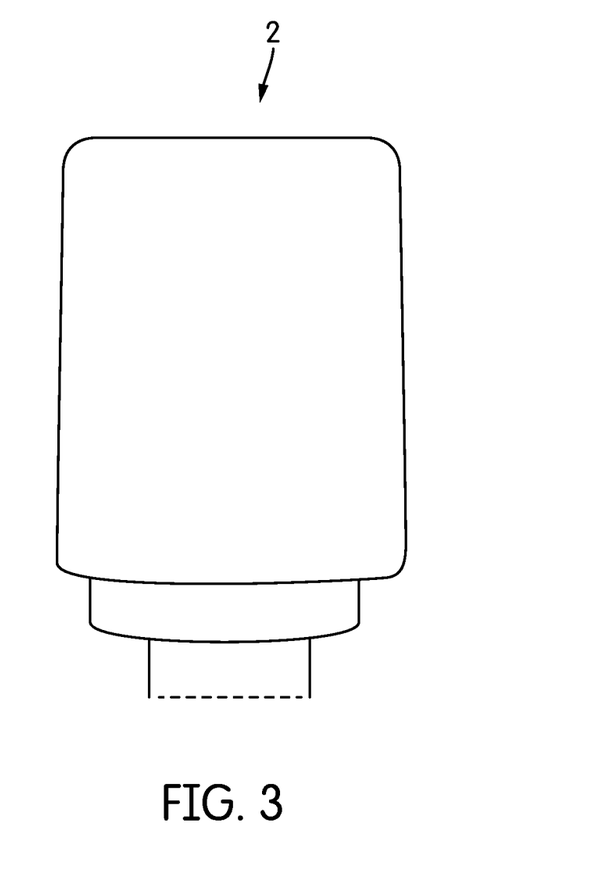
FIG. 3—is a schematic enlarged partial side view of a workpiece according to an embodiment of the present invitation, used in the dental machining system of FIG. 1.

The reference numbers shown in the drawings denote the elements as listed below and will be referred to in the subsequent description of the exemplary embodiments:

1. Dental restoration
2. Workpiece
3. Dental Tool
4. Target Contour
5. Primary location
6. Oversize of material
7. Modified target contour
8. Secondary location
9. Excess of material
10. Dental tool machine
11. Carriage FIG. 1 partly shows a dental machining system according to an embodiment. The dental machining system has a dental tool machine (10) which has two carriages (11) each for driving a dental tool (3) for machining a dental restoration (1) from a workpiece (2). FIG. 2 shows partly a dental tool (3) which can be mounted to any one of the carriages (11). FIG. 3 shows an unused workpiece (2) which can be mounted into the dental tool machine (10). The dental machining system has a control means for individually controlling the carriages (11) during the machining. The control means controls the carriages (11) in accordance with the method of the present invention. The dental machining system preferably has a CAD/CAM module separately from the control means for implementing the method. In the subsequent description, the method will be described.

Figure 1:
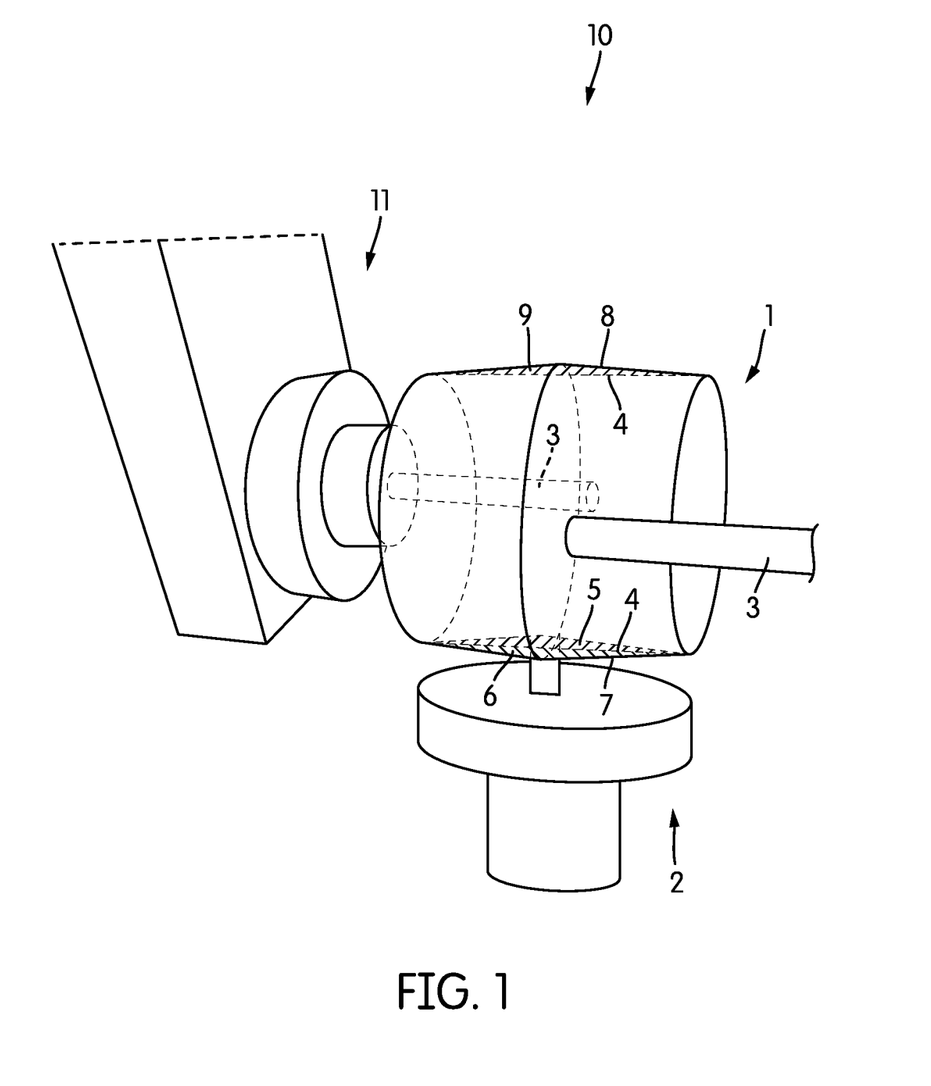

FIG. 1 shows the dental machining system in operation. In a defining step, the target contour (4) of the dental restoration (1) is defined. The target contour (4) has been depicted as a cylinder in FIG. 1 for the ease of illustration. In a predicting step, the deflection of the dental tool (3) that will occur in the pre-machining is predicted beforehand through a model based on one or more machining parameters. The model will be described later in more detail with reference to FIG. 4 and FIG. 5. In a determining step, one or more primary locations (5) at which the target contour (4) would have been damaged during the pre-machining is determined based on the prediction step. In a modifying step, the target contour (4) or the corresponding machining path is modified by adding an oversize of material (6) to the target contour (4) substantially only at the primary locations (5) for preventing any damage. In the present application the term "substantially" is to be interpreted as referring to the limits of technical tolerance of the present machining method. In the pre-machining step, the workpiece (2) is pre-machined based on the modified target contour (7) or the corresponding modified machining path. The defining step, the predicting step, the determining step, and the modifying step are preferably performed in the CAD/CAM module. The pre- and post-machining steps are performed through the control means. The CAD/CAM module can also be integrated into the control means.

Figure 4:
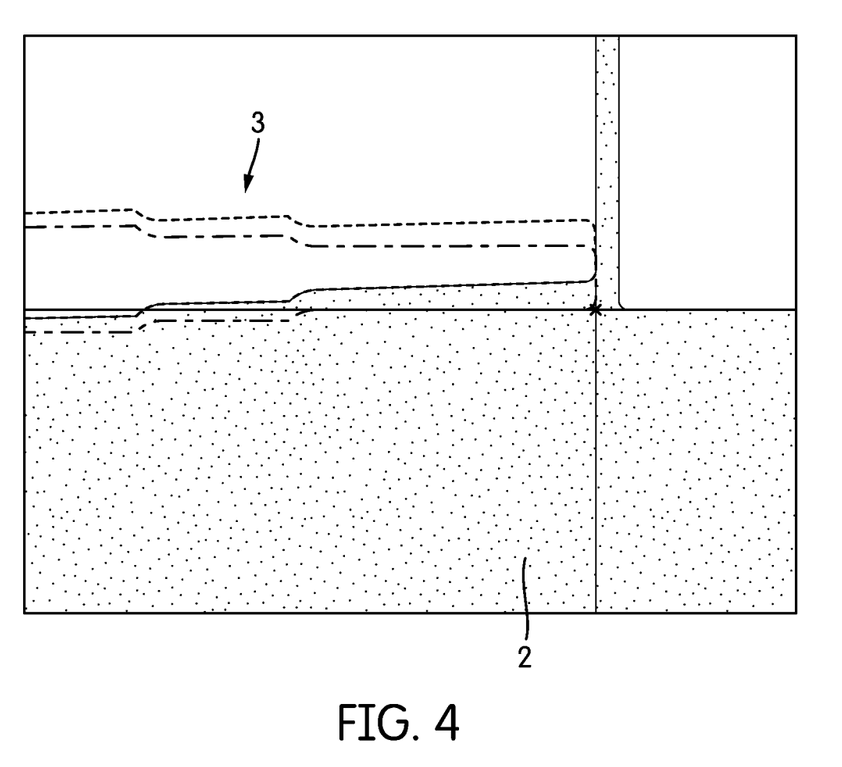
FIG. 4—is a schematic enlarged partial sectional view of an experimental set up showing the deflection of the dental tool of FIG. 2 during machining of the workpiece of FIG. 3.
Figure 5:
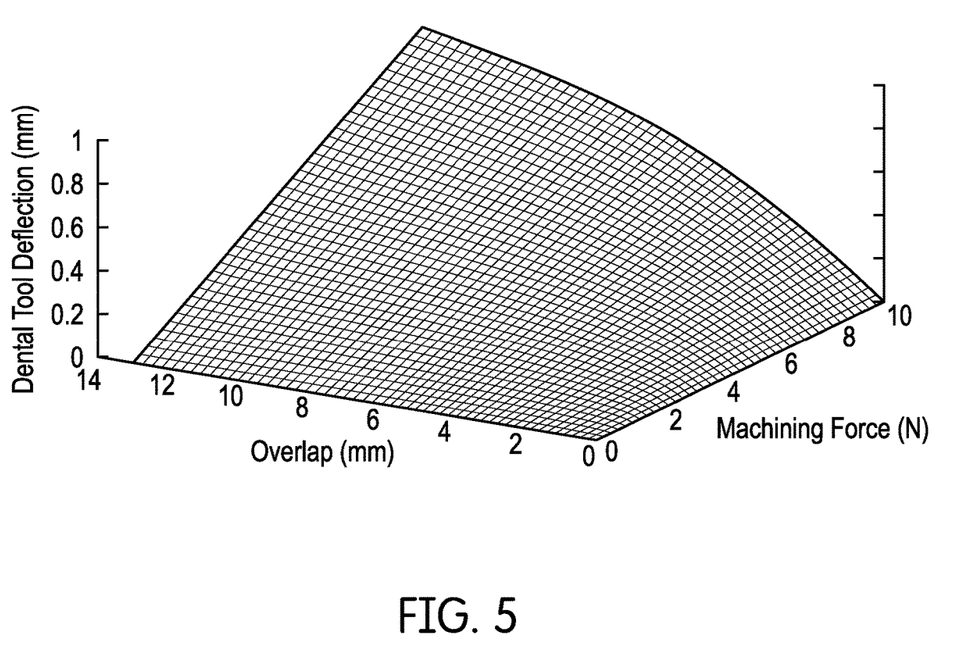
FIG. 5—is a diagram showing the deflection of the dental tool with respect to two machining parameters including the overlap and the machining force.

FIG. 4 partly shows an experimental set up used for preparing the model that predicts the deflection of the dental tool (3) of FIG. 2 during machining of the workpiece (2) of FIG. 3. In FIG. 4, on the left side of the workpiece (2), the lower and upper dashed lines respectively show the target position and the real position of the dental tool (3) during pre-machining for a specific overlap and a specific machining force between the dental tool (3) and the workpiece (2). On the right side of the workpiece (2), the material has been removed by the dental tool (3) down to the target position through pre-machining repeatedly several times until the measured machining force between the dental tool (3) and the workpiece (2) has become zero. With this experimental set up, the deflection of the dental tool (3) has been measured for various values of the overlap and various values of the machining force to produce the 3D characteristic map as shown in FIG. 5. The 3D characteristic map in FIG. 5 can be used as a model to predict the deflection of the dental tool (3) during a pre- and post-machining.

In an embodiment, the method has in addition to the pre-machining step also a post-machining step. In this embodiment, in an additional determining step, one or more secondary locations (8) at which an excess of material (9) will be left after the pre-machining step is determined based on the prediction step. And in the post-machining step, the workpiece (2) is post-machined substantially only at the secondary locations (8) for removal of the excess of material (9).

In an alternative embodiment, in the additional determining step, one or more secondary locations (8) at which an excess of material (9) will be left after the pre-machining step is alternatively determined based on a sensor feedback during the pre-machining step. And in the post-machining step, the workpiece (2) is post-machined substantially only at the secondary locations (8) for removal of the excess of material (9).

In an embodiment, in a dispensing step, it is dispensed with the post-machining of the workpiece (2) at one or more of the secondary locations (8) for removal of the excess of material (9) if at these secondary locations (8) the post-machining is clinically less relevant or irrelevant. The clinical relevance of the secondary locations (8) of the dental restoration (1) can be input by the user through marking on a display of the dental restoration (1) such secondary locations (8). Alternatively, an algorithm for artificial intelligence can be employed.

The invention claimed is:

1. A computer-implemented method of machining a dental restoration from a workpiece using a dental tool, comprising:

defining a target contour of the dental restoration;
further comprising:
predicting a deflection of the dental tool during pre-machining through a model based on one or more machining parameters, wherein the one or more machining parameters include a length of an overlap between the dental tool and the workpiece, and a machining force between the dental tool and the workpiece;
determining based on the predicting, one or more primary locations at which the target contour would have been damaged during pre-machining;
modifying the target contour or a corresponding machining path by adding an oversize of material substantially only at the one or more primary locations for preventing damage; and
pre-machining the workpiece based on the modifying the modified-target contour or the corresponding machining path.

2. The method according to claim 1, further comprising:
determining one or more secondary locations at which an excess of material will be left after the pre-machining the workpiece; and
post-machining the workpiece substantially only at the one or more secondary locations for removal of the excess of material.

3. The method according to claim 2, further comprising:
determining based on a sensor feedback the one or more secondary locations.

4. The method according to claim 2, further comprising:
a step of dispensing with the post-machining of the workpiece at one or more of the secondary locations for removal of the excess of material if at these secondary locations the post-machining is clinically irrelevant.

5. The method according to claim 2, wherein an infeed in the pre-machining is larger than an infeed in the post-machining.

6. The method according to claim 2, wherein in the pre-machining the dental tool is configured for rough machining, and in the post-machining the dental tool is configured for fine machining.

7. The method according to claim 3, further comprising:
a step of dispensing with the post-machining of the workpiece at one or more of the secondary locations for removal of the excess of material if at these secondary locations the post-machining is clinically irrelevant.

8. The method according to claim 3, wherein an infeed in the pre-machining is larger than an infeed in the post-machining.

9. The method according to claim 3, wherein in the pre-machining the dental tool is configured for rough machining, and in the post-machining the dental tool is configured for fine machining.

10. A dental machining system comprising:
a dental tool machine comprising one or more carriages each for driving the dental tool for machining the dental restoration from the workpiece; and
a control means for individually controlling the one or more carriages to perform the machining according to the method of claim 1.

11. A non-transitory computer-readable storage medium storing a program which, when executed by a computer system, causes the computer system to perform the method step as defined in claim 1.

* * * * *

UNITED STATES PATENT AND TRADEMARK OFFICE
CERTIFICATE OF CORRECTION

| | | |
|---|---|---|
| PATENT NO. | : 12,402,990 B2 | Page 1 of 1 |
| APPLICATION NO. | : 17/641128 | |
| DATED | : September 2, 2025 | |
| INVENTOR(S) | : Schneider et al. | |

It is certified that error appears in the above-identified patent and that said Letters Patent is hereby corrected as shown below:

On the Title Page

In item (57), in "Abstract", in Column 2, Line 2, delete "took" and insert --tools-- therefor In item (57), in "Abstract", in Column 2, Line 3, delete "defining," and insert --defining-- therefor On page 2, in Column 1, item (57), under "Abstract", Line 1, delete "(17)" and insert --(7)-- therefor In the Claims In Column 6, Line 18, in Claim 1, delete "modified-target" and insert --target-- therefor Signed and Sealed this
Twenty-first Day of October, 2025

John A. Squires
*Director of the United States Patent and Trademark Office*